US012770249B2

(12) United States Patent
Yeo et al.

(10) Patent No.: US 12,770,249 B2
(45) Date of Patent: Oct. 20, 2026

(54) METHOD FOR GENERATING PROXIMITY CORRECTION MODEL, METHOD FOR PROCESSING PROXIMITY CORRECTION USING GENERATED PROXIMITY CORRECTION MODEL AND PROXIMITY CORRECTION SYSTEM THEREOF

(71) Applicant: Samsung Electronics Co., Ltd., Suwon-si (KR)

(72) Inventors: Sang Chul Yeo, Suwon-si (KR); Jae Won Yang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 255 days.

(21) Appl. No.: 18/631,579

(22) Filed: Apr. 10, 2024

(65) Prior Publication Data

US 2025/0117924 A1 Apr. 10, 2025

(30) Foreign Application Priority Data

Oct. 6, 2023 (KR) ........................ 10-2023-0133363

(51) Int. Cl.
*G06K 9/00* (2022.01)
*G06T 7/00* (2017.01)

(52) U.S. Cl.
CPC .... *G06T 7/001* (2013.01); *G06T 2207/20081* (2013.01); *G06T 2207/30148* (2013.01)

(58) Field of Classification Search
USPC ....... 382/100, 103, 141, 144, 156, 168, 181, 382/254, 283, 305, 312; 438/694; 250/311
See application file for complete search history.

(56) References Cited

U.S. PATENT DOCUMENTS

| | | | | |
|---|---|---|---|---|
| 8,759,763 | B2 * | 6/2014 | Sohn | H01J 37/28 250/311 |
| 10,395,356 | B2 | 8/2019 | Zhang et al. | |
| 10,672,129 | B1 | 6/2020 | Yoo | |
| 11,561,477 | B2 | 1/2023 | Su et al. | |
| 2015/0050810 | A1 * | 2/2015 | Lee | G03F 1/36 438/694 |
| 2018/0278832 | A1 * | 9/2018 | Shabtay | G02B 27/646 |
| 2019/0312072 | A1 * | 10/2019 | Cho | G02B 5/003 |
| 2021/0232863 | A1 * | 7/2021 | Seo | G06F 18/214 |
| 2022/0035237 | A1 | 2/2022 | Lee et al. | |
| 2022/0100935 | A1 | 3/2022 | Chen | |
| 2022/0292669 | A1 * | 9/2022 | Cho | G03F 7/70666 |

FOREIGN PATENT DOCUMENTS

| | | | |
|---|---|---|---|
| CN | 110163852 | A | 8/2019 |
| CN | 115424127 | A | 12/2022 |
| KR | 10-2021-0114694 | A | 9/2021 |
| KR | 10-2023-0131715 | A | 9/2023 |

* cited by examiner

*Primary Examiner* — Seyed H Azarian
(74) *Attorney, Agent, or Firm* — Harness, Dickey & Pierce, P.L.C.

(57) ABSTRACT

A method for generating a proximity correction model which is performed by a computing system is provided. The method comprises acquiring a plurality of shot images on a wafer after performing a first process using a first layout, generating an overlap image obtained by overlap of the plurality of shot images, and performing machine learning on the proximity correction model, using an image of the first layout and the overlap image.

19 Claims, 7 Drawing Sheets

METHOD FOR GENERATING PROXIMITY CORRECTION MODEL, METHOD FOR PROCESSING PROXIMITY CORRECTION USING GENERATED PROXIMITY CORRECTION MODEL AND PROXIMITY CORRECTION SYSTEM THEREOF

CROSS-REFERENCE TO RELATED APPLICATION

This application claims priority from Korean Patent Application No. 10-2023-0133363 filed on Oct. 6, 2023 in the Korean Intellectual Property Office and all the benefits accruing therefrom under 35 U.S.C. 119, the contents of which are herein incorporated by reference in their entirety.

BACKGROUND

1. Field of the Invention

The present invention relates to a method for generating a proximity correction model, a method for performing a proximity correction process using the proximity correction model, and a proximity correction process system. More specifically, the present invention relates to a method for generating a machine learning-based proximity correction model, applying an input layout image to the proximity correction model, thereby predicting an image of a pattern generated when the input layout is applied to a first process, and performing the proximity correction process, using such a prediction.

2. Description of the Related Art

With miniaturization of semiconductor processes, a degree of difficulty of accurately forming intended target patterns on a wafer becomes high. A target pattern is formed on the wafer by performing a photolithography process using a mask layout and an etching process using a photoresist pattern formed as a result of the photolithography process. In this process, deviations in optical path due to various process conditions, known as an optical proximity effect (OPE) or a process proximity effect (PPE), increase, and a correction thereof is required.

An optical proximity correction (OPT) or a process proximity correction (PPC) is performed to reduce the influences of OPE or PPE. The OPC may be understood as a process in which the mask layout is artificially adjusted by comparing a photoresist pattern expected as a result of applying the mask layout to the photolithography process with a target photoresist pattern, and the PPC may be understood as a process in which a photoresist pattern is artificially adjusted by comparing an etching pattern expected as a result of applying the photoresist pattern to the etching process with a target etching pattern.

A technique of generating an OPC model that infers a photoresist pattern by receiving data about the mask layout using machine learning is provided. Incidentally, the learning data used in the machine learning procedure of the OPC model does not appropriately reflect the variation that occurs in the process of measuring a photoresist pattern on a wafer. For example, due to the miniaturization of the semiconductor manufacturing process described above, measurement data of the photoresist pattern is generated by integrating multi-shot microscopic photography data on FOV (Field Of View) on the wafer. However, information about variation occurring between each shot is not properly reflected on the above learning data. That is, the learning data lacks information about the variation as a measured result of the photoresist pattern, and as a result, an OPC model which has a problem in robustness due to overfitting only to the learning data is generated.

Similar to the OPC model described above, a technique of generating a PPC model that receives data about a photoresist pattern and infers an etching pattern using machine learning is provided. However, the learning data used in the machine learning procedure of the PPC model also does not appropriately reflect the variation that occurs in the process of measuring the etching pattern on the wafer. That is, a PPC model learned using learning data that does not reflect the variation that exists in the process of measuring an etching pattern has a problem in robustness.

SUMMARY

A technical aspect to be achieved through some embodiments of the present disclosure provides a method and a system for generating a proximity correction model that is robust to noise or variation that may be included in the actually input data by a machine learning method, by reflecting information about the variation of measurement data included in the learning data on the machine learning process.

Another technical aspect to be achieved through some embodiments of the present disclosure provides an image-to-image type deep learning method and a system thereof for reflecting information about the variation of measurement data included in the learning data on the machine learning process.

Another technical aspect to be achieved through some embodiments of the present disclosure provides a method and a processing system thereof for performing a proximity correction process such as an OPC or a PPC, using proximity correction models that are robust to noise or variation that may be included in the data to be actually input.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present disclosure, there is provided a method for generating a proximity correction model which is performed by a computing system. The method comprises acquiring a plurality of shot images of a wafer after performing a first process on the wafer using a first layout, generating an overlap image obtained by overlap of the plurality of shot images and performing machine learning on the proximity correction model, based on an image of the first layout and the overlap image.

According to other aspect of the present disclosure, there is provided a proximity correction method of a manufacturing process which is performed by a computing system. The method comprises inputting, to a machine-learned proximity correction model, image data of a first layout, generating, using output data of the proximity correction model, a predicted image of a pattern formed after performing a first process using the first layout, and performing a proximity correction process based on a difference between the predicted image and a target image. The proximity correction model may be machine-learned using an overlap image obtained by overlapping a plurality of shot images of a wafer after performing the first process on the wafer.

According to another aspect of the present disclosure, there is provided a proximity correction process system. The system comprises a communication interface configured to receive image data of a first layout, a storage storing executable data of a computer program, memory, and a processor configured to execute computer programs loaded into the memory. The computer program comprises an instructions, which when executed by the processor causes the proximity correction process system to input the received image data of the first layout to the proximity correction model, generate a predicted image of a pattern formed after execution of a first process using the first layout using output data of the proximity correction model, and perform a proximity correction process using a difference between the predicted image and a target image. The proximity correction model may be a model which is machine-learned using an overlap image obtained by overlapping a plurality of shot images on a wafer after execution of the first process.

BRIEF DESCRIPTION OF THE DRAWINGS

The above and other aspects and features of the present invention will become more apparent by describing in detail example embodiments thereof with reference to the attached drawings, in which.

DETAILED DESCRIPTION OF THE EMBODIMENTS

Figure 1:
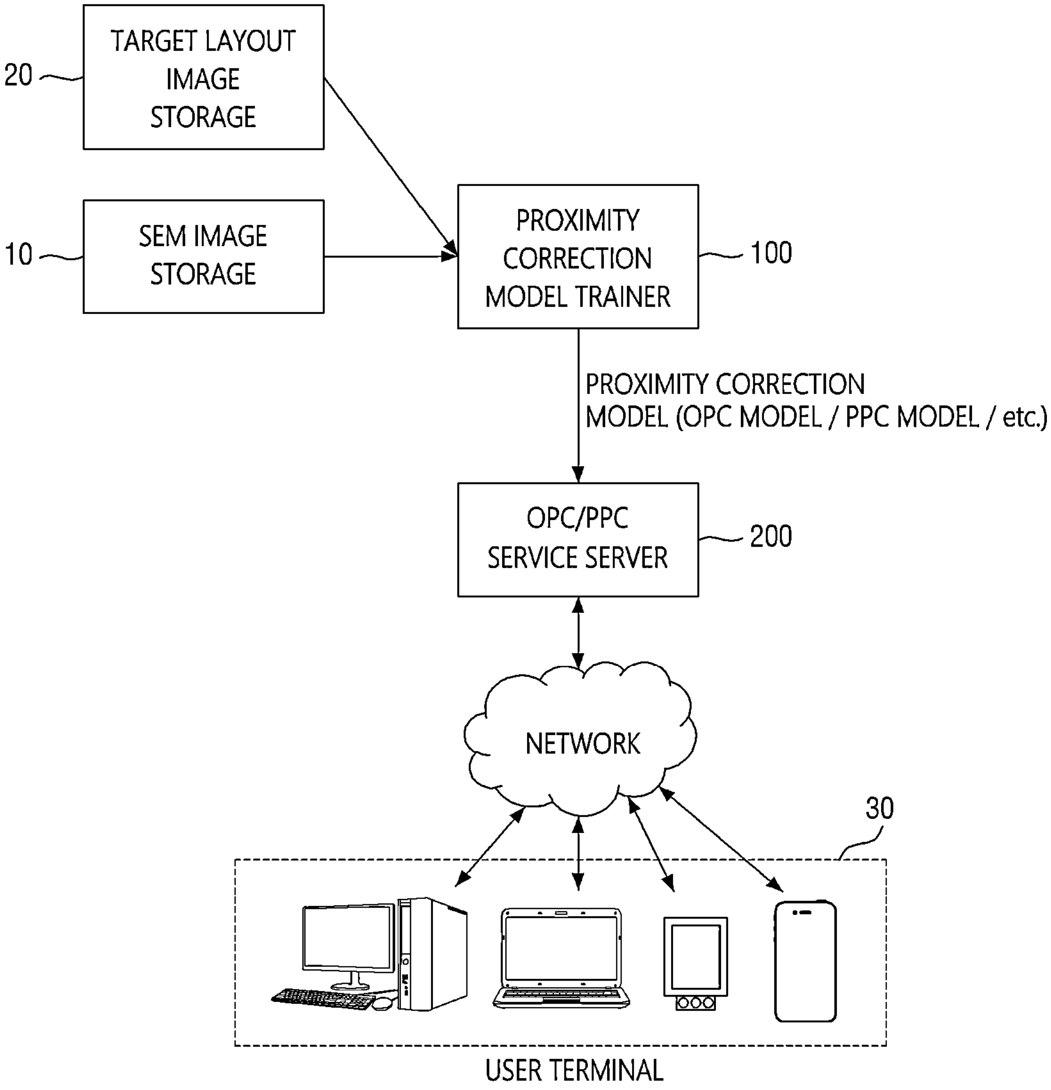
FIG. 1 is a configuration diagram of a proximity correction system according to at least one embodiment of the present disclosure.

Hereinafter, example embodiments of the present disclosure will be described with reference to the attached drawings. The advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents. In describing the present disclosure, if it is determined that a detailed description of a related known configuration or function may obscure the gist of the present invention, the detailed description will be omitted.

The singular expressions used in the following embodiments include plural concepts, unless the context clearly specifies singularity. Additionally, plural expressions include singular concepts, unless the context clearly specifies plurality. In addition, terms such as first, second, A, B, (a), (b) used in the following embodiments are only used to distinguish one element from another element, and the terms do not limit the nature, sequence, or order of the relevant elements.

The elements described with reference to terms such as compute instance, computing system, unit, module, block, ~or, ~er, etc. used in the present disclosure and the functional blocks shown in the drawings may be implemented in processing circuitry such as, software, hardware, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, the software may be machine code, firmware, embedded code, application software, and/or the like. For example, the hardware may include an electrical circuit, an electronic circuit, a processor, a computer, an integrated circuit, integrated circuit cores, passive components, a combination thereof, and/or the like.

A configuration and an operation of a proximity correction system according to at least one embodiment of the present disclosure will be described below with reference to FIGS. 1 to 5. As shown in FIG. 1, the proximity correction system may include a proximity correction model trainer 100. Furthermore, in some embodiments, the proximity correction system may further include a service server 200 that services proximity correction processes such as an optical proximity correction (OPC) and/or a process proximity compensation PPC, and at least one of a SEM image storage 10 that stores electron microscopy (SEM) images that are measured results about objects such as wafers and a target layout storage 20 that stores an image of a target layout for forming a desired pattern on a wafer.

In at least one embodiment, the proximity correction model trainer 100 may be made up of one or more computing devices. For example, the proximity correction model trainer 100 may be made up of one or more cloud compute instances, and/or the proximity correction model trainer 100 may be made up of compute instances included in (or comprising of) one or more virtual machines and/or one or more containers.

Further, the proximity correction model trainer 100 may be configured to include both physical servers (e.g., in the form of on-premise instances) and the cloud compute instances. For example, considering a situation in which there is a need to process data with high security requirements, the modules that analyze or store the data at least temporarily may be implemented on an on-premise physical server located on a local network blocked from the Internet by firewall, and other modules may be configured using the cloud compute instances.

In this disclosure, the term "proximity correction" refers to a process of correcting for an occurrence of optical path deviation due to various process conditions known as an optical proximity effect (OPE) and/or a process proximity effect (PPE) in the manufacturing process, and an OPC, an ILT (Inverse Lithography Technology), and a PPC may be considered as some examples of the proximity corrections.

Hereinafter, the OPC and the PPC will be described as example proximity correction processes to facilitate understanding of the present disclosure. However, the proximity correction of the present disclosure should not be limited to that performed in a semiconductor manufacturing process. It should be understood that the proximity correction of the present disclosure generically also includes processes of performing correction on the optical proximity effect and/or the process proximity effect in the manufacturing processes in fields other than semiconductors, such as display panels.

The proximity correction model trainer 100 is configured to generate a proximity correction model using machine learning. For example, the proximity correction model may be understood as a model that receives layout data, and is configured to infer data of a pattern formed (corresponding to the layout after performing a specific process) as its output.

In some embodiments, the proximity correction model may be an image-to-image type model. For example, the proximity correction model may be a model that maps an input image to an output image. The data that is input to the proximity correction model may be an image of a layout, and the data to be output may be an image of a pattern formed corresponding to the layout. The proximity correction model may be an artificial neural network (ANT)-based model that is configured to learns (input layout image, and pattern image) using an image of an actual pattern formed as a result of performing a specific process for the input layout, and outputs a pattern image formed as an execution result of the specific process, when a new layout image is input.

In some embodiments, the proximity correction model may be a CNN (Convolutional Neural Network)-based model. For example, the proximity correction model may be a DCGAN (Deep Convolutional Generative Adversarial Network)-based model.

In some embodiments, the proximity correction model may be a GAN (Generative Adversarial Network)-based model. For example, the proximity correction model may be configured to include a generator trained to produce fake pattern images such that a discriminator has difficulty distinguishing between real pattern images and the fake pattern images generated by the generator. An architecture of the proximity correction model will be described in more detail below with reference to FIG. 8.

In at least some embodiments, the service server 200 is configured to provide the user terminal 30 with a service for executing an OPC process or a PPC process, using the proximity correction model. For example, the service server 200 may be a part of a semiconductor design automation (EDA) server, and/or may be a server that operates in conjunction with the semiconductor design automation service server.

For example, the service server 200 may transmit data of one or more user interfaces for adjusting the layout of the photoresist pattern to the user terminal 30, using a difference between the output image of the proximity correction model and an ADI (After Develop Inspection) target image. At this time, the layout that is input to the proximity correction model may be a layout of the mask, and the proximity correction model may be a model for inferring the photoresist pattern that is developed on the wafer, after the photoresist process using the layout of the mask is performed.

Further, for example, the service server 200 may provide, to the user terminal 30, one or more user interface for adjusting the layout of the photoresist pattern based on the difference between the output image of the proximity correction model and the ACI (After Cleaning Inspection) target image. At this time, the layout (e.g., the input to the proximity correction model) may be and/or include a layout of a photoresist pattern, and the proximity correction model may be a model configured to infer the etching pattern formed on the wafer (e.g., after the etching process using the layout of the photoresist pattern is performed). Therefore, the user interface may receive user input for indicating the layout to be inputted into the proximity correction model configured to predict an etching pattern from a new photoresist pattern, thereby allowing for the confirmation of the new photoresist pattern without the production of a wafer, thereby reducing the cost for developing new photoresist patterns. Further, in at least one embodiment, the user terminal 30, using the proximity correction model, may be further configured to pause production of wafer in cases wherein a difference between the predicted etching pattern and a target pattern is greater than a manufacturing tolerance. Additionally, in at least some embodiments (as discussed below in further detail), the trained proximity correction model may be used to infer a correction for the photoresist pattern and the inferred correction may be then applied to the new photoresist and a corrected etching pattern formed therefrom.

Figure 2:
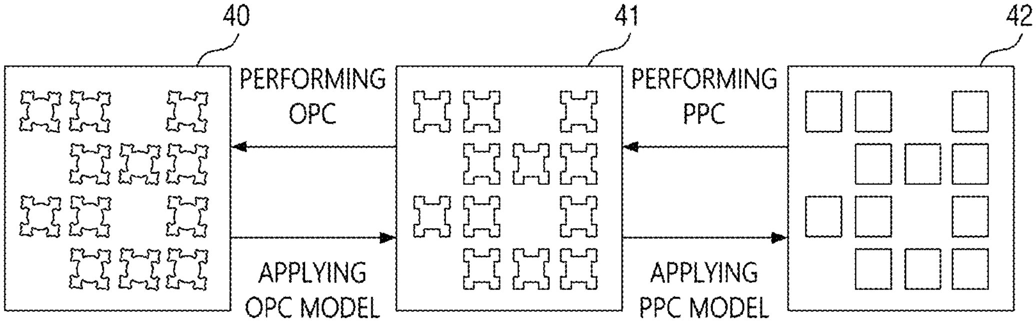
FIG. 2 is a conceptual diagram for explaining the operation results of the proximity correction system described with reference to FIG. 1.

Operation results of the proximity correction system according to the present embodiment will be described referring to FIG. 2. The proximity correction system applies an image 40 of a mask layout specified in the target layout storage 20 from the user terminal 30 to an OPC model, thereby providing data about an expected photoresist pattern 41 to be obtained when performing the photolithography process using the mask layout to the user terminal 30. A user of the user terminal 30 may check the expected photoresist pattern 41 and may apply an input for adjusting the mask layout to the user terminal 30 accordingly.

In addition, the proximity correction system applies the image 41 of the photoresist pattern specified from the user terminal 30 to the PPC model, thereby providing data about the expected etching pattern 42 to be obtained when performing the etching process using the photoresist pattern to the user terminal 30.

A user of the user terminal 30 may check the expected etch pattern 42 and apply an input for adjusting the photoresist pattern to the user terminal 30 accordingly. Then, a pattern may be produced on a wafer based on the adjusted photoresist pattern.

The proximity correction model trainer 100 may receive data from the SEM image storage 10 and the target layout storage 20 for machine learning of the proximity correction model, and may configure the learning data using the received data. In at least some embodiments, such a learning data configuration task may be performed outside the proximity correction model trainer 100. In these cases, the proximity correction model trainer 100 is provided with a learning data set, and may perform the learning task of the proximity correction models, using the provided learning data set.

Image pairs (layout image and pattern image) may be configured to configure the learning data described above. For example, the identifier of the layout image may be matched with the pattern image data stored in the SEM image storage device 10 to configure image pairs. Further, in some embodiments, each of the layout image and the pattern image includes an execution identifier of the process that caused the formation of the pattern, and pair of images (layout image and pattern image) may be configured on the basis of such an execution identifier.

The proximity correction model trainer 100 may perform the machine learning of the proximity correction model using the learning data. The machine learning may be performed until the proximity correction model reaches a target performance. For example, the proximity correction model trainer 100 may repeat the machine learning on the proximity correction model, until an error of a critical dimension (CD) of the pattern image inferred by the proximity correction model becomes less than a reference value.

In at least some embodiments, the proximity correction model trainer 100 may perform the machine learning of the proximity correction model, using a function provided by MLOps (Machine Learning Operations). For example, the proximity correction model trainer 100 may be a computing system configured to include one or more computing devices that perform computations related to the machine learning.

In at least some embodiments, with the miniaturization of processes, it may be necessary to take multiple electron microscopic shots (multi-shot) instead of just one electron microscopic shot to accurately measure the patterns formed as a result of process execution, and as a result, the plurality of shot images may be generated as measured results for the same pattern. At this time, the pattern image of the learning data may include the plurality of shot images.

An average image of the plurality of shot images may be generated as a representative image of the plurality of shot images. In some embodiments, an image including an average of contours of pattern extracted from each of the plurality of shot images may be generated as the representative image. In the machine learning procedure, the representative image may be used as a correct image for the layout image.

Figure 3:
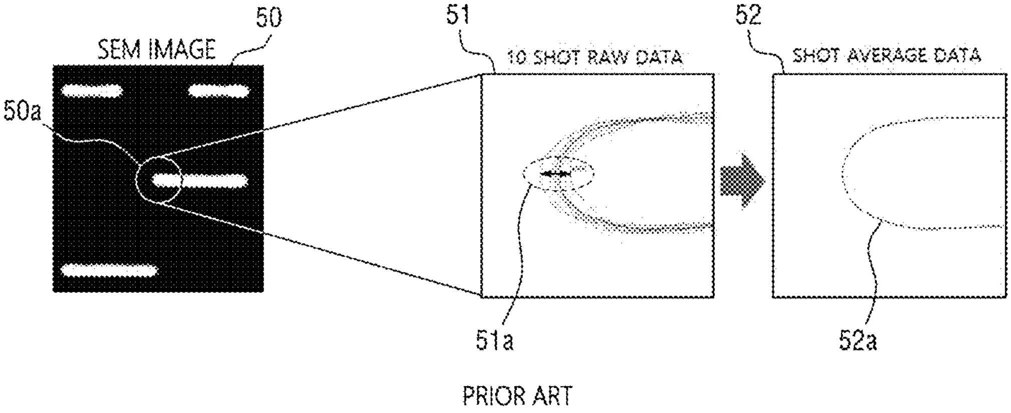
FIG. 3 is a diagram for explaining that information about variation of measurement data according to the related art is removed in the process of calculating representative data.

Variation may exist between the plurality of shot images, and a representative image in the form of an average image fails to effectively reflect such variation. This will be explained with reference to FIG. 3. FIG. 3 shows an example image 51 obtained by overlapping a raw data of a raw contour of the pattern extracted from each of the plurality of shot images. The raw contour may be a linear representation of the contour of the pattern included in the shot image with a predetermined (or otherwise determined) thickness. For example, the thickness may be understood as a minimum width value for the contour of the pattern to be expressed linearly. For example, the thickness may be 1 or 2. That is, the linear representation of the raw contour may have width of one pixel or two pixels.

A line-end 50*a* area included in the SEM image 50 on the measurement target area (FIV) of the pattern is an area in which variation may exist between the plurality of shot images. The example image 51 of FIG. 3 also shows that the variations of the raw contours of each shot image spread significantly in the line-end area 51*a*.

In the related art, an image of an average contour 52*a* obtained by averaging the pattern contours extracted from each of the plurality of shot images has been used as the representative image 52 of the pattern measured in the field of view (FOV), in the machine learning of the proximity correction model. However, the representative image 52 does not include information that the variation of the line-end 50*a* area is larger than the variation of other areas. Therefore, there is room for the proximity correction model (trained using the learning data including the representative image 52) to become overfit to the learning data, and thereby not compensate for (or consider) the variances in contour.

On the other hand, the proximity correction model trainer 100 of the present embodiment may perform the machine learning of the proximity correction model using an overlap image obtained by overlapping the plurality of shot images to reflect the above-described variation in the learning of the proximity correction model.

In some embodiments, the proximity correction model trainer 100 may perform a process of preparing a learning data set, and if so, the proximity correction model trainer 100 may generate the overlap image. In some other embodiments, the proximity correction system of the present disclosure may further include a data preparator (not shown) that is configured to provide the learning data set used by the proximity correction model trainer 100. The learning data may be configured in the form of (layout image, overlap image, and representative image), and the data preparation section may generate the overlap image.

Figure 4:
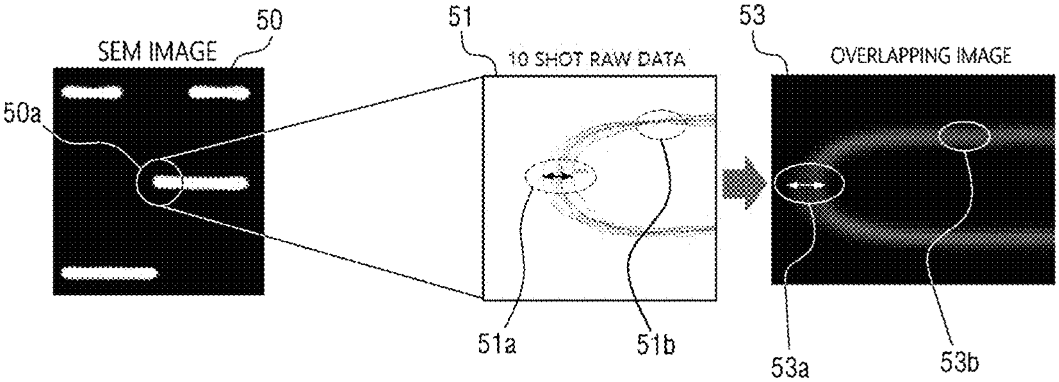
FIG. 4 is a diagram for explaining that information about variation is maintained in learning data according to some embodiments of the present disclosure.

The overlap image will be explained with reference to FIG. 4. FIG. 4 also shows the same SEM image 50 and example image 51 as those shown in FIG. 3. A line-end area 50*a* and a line area 51*b* are displayed in the example image 51. As mentioned above, in general, the variation in the line-end area 50*a* may be greater than the variation in line area 51*b*, and the raw contours of each of the plurality of shot images represented in the example image 51 of FIG. 4 also exhibit a higher variation in the line-end area 50*a* than in the line area 51*b*.

The overlap image may be obtained by overlapping the plurality of shot images. In the process of generating the overlap image, the raw contour of the pattern may be extracted from each of the plurality of shot images, the predetermined image processing may be performed on the image expressing the raw contour, and the resulting images subjected to the predetermined image processing may overlap.

FIG. 4 shows an example overlap image 53.

In FIG. 4, it may be seen that the width of the line-end area 53*a* is expressed to be wider than the width of the line area 53*b*, and this means that the variation of the line-end area 53*a* is wider than the variation of line area 53*b*. In addition to the line-end area of the pattern, a corner area of the pattern or a convex area of the pattern may be represented as areas with lower measurement reliability than the line area.

In some embodiments, the predetermined image processing may be performed such that the line-end area 53*a* of the overlap image 53 has a first sharpness indicating a first measurement confidence, and the line-end area 53*b* of the overlap image 53 has a second sharpness indicating a second measurement confidence. At this time, the higher the measurement reliability is, the higher the sharpness of the overlap image 53 may be.

In the procedure of overlapping the plurality of shot images, a task of summing the pixel values of each shot image with each other may be performed. Taking this point into consideration, each pixel value may be suppressed to a predetermined (or otherwise determined) ratio through the predetermined image processing. For example, the predetermined image processing may include a task of uniformly adjusting each pixel value to a predetermined ratio.

For example, each pixel of the overlap image 53 may have a value between 0 (black) and 255 (white). At this time, it will be understood that the background of the overlap image 53 is black and the pixel value of maximum sharpness is 255. When the predetermined ratio is 20%, the pixel of a position corresponding to the contour of the pattern and having the maximum sharpness pixel value of 255 may have a pixel value adjusted from 255 to 50 by predetermined image processing. Even if the pixel values at positions corresponding to the contours of each shot image are suppressed by the image processing described above, the overlap image 53 is generated as a result of overlapping the plurality of shot images. Accordingly, the pixel value of the position corresponding to the contour of the overlap image 53 will have a higher (brighter) value than the suppressed pixel value, depending on the variation of that position.

In some embodiments, the predetermined ratio may have a fixed value. In some other embodiments, the predetermined ratio may be a value determined corresponding to the number of shots. At this time, the predetermined ratio may be determined to be lower as the number of shots increases. For example, in at least one embodiment, if the number of shots is 10, the predetermined ratio may be determined to be 10% (1/10), and if the number of shots is 50, the predetermined ratio may be determined to be 2% (1/50).

Because the pixel value of the position corresponding to the contour is suppressed in comparison to the pixel value of maximum sharpness, the pixel value of the overlap image differs when the contours of plurality of shot images match and do not match. Accordingly, the sharpness may be expressed differently. For example, in the cases, the overlap image 53 expresses an area in which the variation between the respective shot images is high, as a lower sharpness, and expresses an area in which the variation is low, as a higher sharpness.

That is, when a first area of the overlap image 53 has a first variation, a second area that does not overlap the first area has a second variation, and the first variation is higher than the second variation, the sharpness of the first area will be lower than the sharpness of the second area. To explain again, on the overlap image 53, the area with the lower variation will represent the pattern more clearly than the area with the higher variation. The overlap image 53 expresses not only information about the contour of the pattern, but also information about variation which may differ for each area of the pattern, in the form of sharpness of contour. Therefore, in terms of the learning data, the overlap image 53 is data that includes more diverse types of information than the representative image 52 of FIG. 3.

In some other embodiments, the predetermined image processing may include performing dithering on the raw contour. The dithering means image processing technology used in computer graphics to create the illusion of color depth in images on systems with a limited color palette. In a dithered image, colors that are not available in the palette are approximated by a diffusion of colored pixels from within the available palette. The overlap image in this case may be understood as an image obtained by overlapping the dithered raw contours of each of the plurality of shot images. The generation procedure of the overlap image will be explained with reference to FIG. 5.

Figure 5:
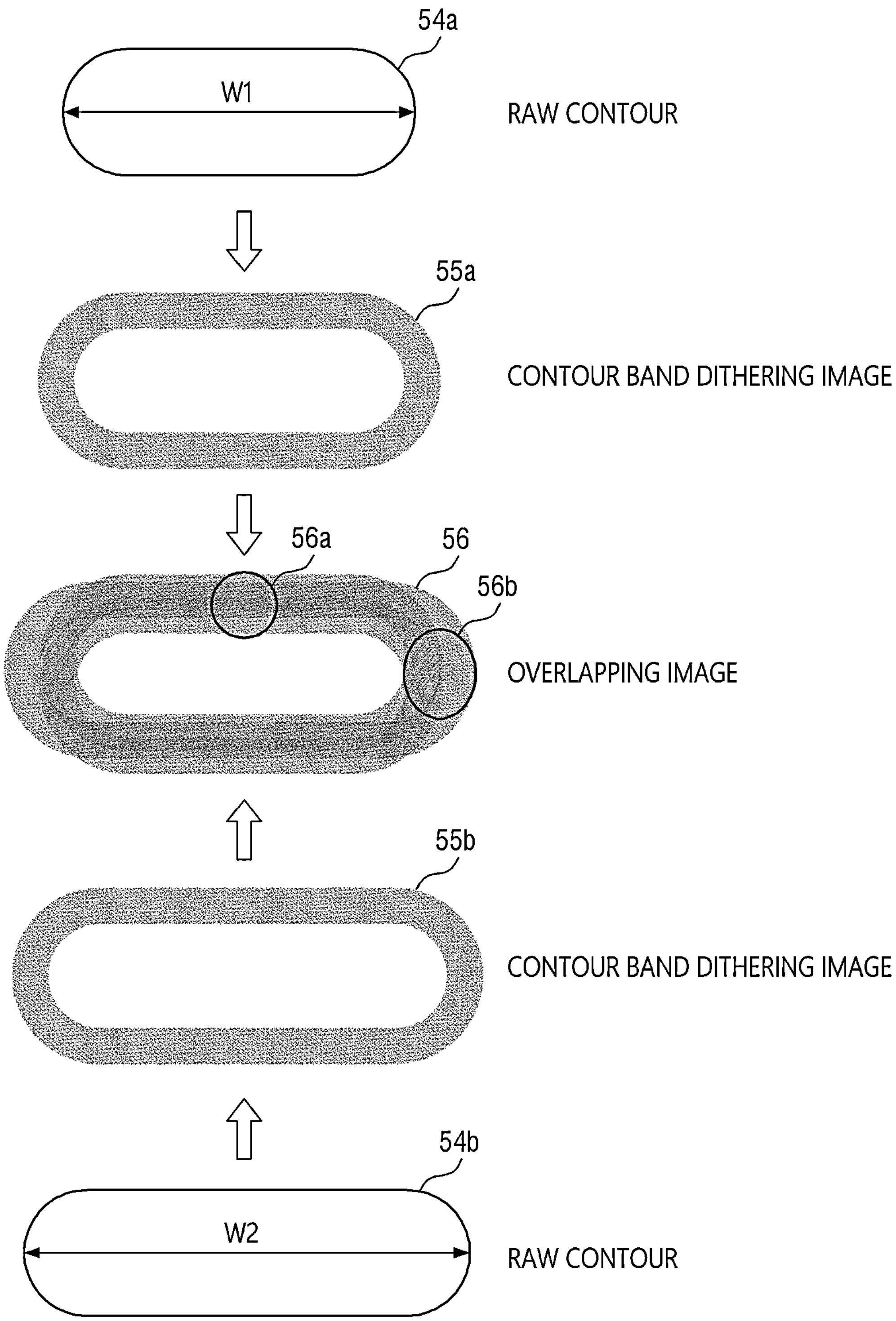
FIG. 5 is a diagram for explaining an image processing procedure performed when generating learning data in some embodiments of the present disclosure.

First, a first raw contour 54*a* may be extracted from the first shot image included in the plurality of shot images that are measured results for the same FOV, and as a variation occurs in the measurement for the FOV, a second raw contour 54*b* different from the first raw contour 54*a* may be extracted from the second shot image. In FIG. 5, the width of the first raw contour 54*a* is W1, whereas the width of the second raw contour 54*b* is W2, which is different from W1.

Dithering may then be performed on each of the first raw contour 54*a* and the second raw contour 54*b* to generate dithered contour band images 55*a* and 55*b* as a result. The raw contour of a line shape may be modified into a smooth band shape by the dithering. Next, an overlap image 56 in which the contour band images 55*a* and 55*b* overlap may be generated.

Although FIG. 5 shows the overlap of two shot images, the example is not limited thereto, as it will be appreciated that the overlap image 56 is generated by performing the overlapping of the plurality of shot images, which may be greater than two shot images. Of course, in some embodiments, an outlier shot image that fails to pass a predetermined criterion among the plurality of shot images may be excluded from the overlap target.

The overlap image 56 of FIG. 5 includes a line area 56*a* of low variation and a line-end area 56*b* of high variation. Further, the overlap image 56 represents variation information about a wider contour band area than the example image 51 of FIG. 4, which is generated as a result of direct overlap of the raw contour. Further, due to the features of dithering, variation information will not be missed within the contour band area. According to this feature, the overlap image 56 is information including variation information about the measured pattern, and may serve as good learning data for reflecting the variation in the machine learning procedure of the proximity correction model.

In some embodiments, dithering of each shot image may be performed at the same level so that the overlap image 56 may be used as learning data.

Additionally, in some other embodiments, the level of dithering for each shot image may be adaptively determined on the basis of the number of shots on the FOV. For example, the level of dithering may be determined to be lower as the number of shots on the FOV increases. As the number of shots increases, the contour band area will cover a wide area on the overlap images by the variation between each shot. Considering this point, by applying dithering of a lower level as the number of shots increases, it is possible to make the contour band areas of each shot image on the overlap image overlap to an appropriate level. Furthermore, it is possible to make the variation of each position represented by the overlap images have values of an appropriate range, accordingly.

Additionally, in some other embodiments, the level of dithering for each shot image may be determined dynamically, using the shot image's quality index. For example, since the level of dithering is determined to be higher as the quality index is lower, it is possible to lower the reliability of the raw contour extracted from the low-quality shot image and widen the band area of the raw contour. The quality index may be a value determined using metadata of the SEM image. For example, the quality index may be determined to have a higher value as the sharpness of the SEM image is high.

The proximity correction model trainer 100 may perform the machine learning on the proximity correction model, using the above-mentioned overlap images. In the machine learning procedure, the aforementioned representative data is used as the correct image, and the overlap image is used as reference data for determining a weight reflected in the loss data used for an error back-propagation. An operation in which the proximity correction model trainer 100 performs the machine learning using the overlap image will be described in detail below with reference to FIG. 8.

The configuration and operation of the proximity correction system according to the present embodiment have been described above. In the above disclosure, the proximity correction system according to the present embodiment may perform the machine learning on the proximity correction model that infers a pattern formed as a result of performing a specific process using the input layout, and may provide a service for executing the proximity correction process such as an OPC and a PPC, using the machine-learned proximity correction model.

However, in some other embodiments, the proximity correction model may infer a final pattern formed as a result of performing two or more processes executed in succession. An example will be described again with reference to FIG. 2. Considering that the photoresist pattern 41 is an intermediate pattern for forming the etching pattern 42 on the wafer in the semiconductor manufacturing process, in some embodiments, the proximity correction system may provide a function that assists in the adjustment for forming a target etching pattern 42. To this end, the proximity correction model trainer 100 receives an image of a mask layout, and may perform the machine learn on an integrated model that infers an etching pattern formed by sequentially performing the photolithography process and the etching process using the mask layout. (Mask layout image, and etching pattern image) may be used as learning data for the machine learning of the integrated model.

The proximity correction system according to the present embodiment has been described above with reference to FIGS. 1 to 5. The method of operation of the proximity correction system of the present disclosure may be understood in more detail with reference to other embodiments described below. Further, the technical idea that may be understood by the above-described embodiment of the proximity correction system may be reflected in other embodiments described later even if it is not specified separately.

Figure 6:
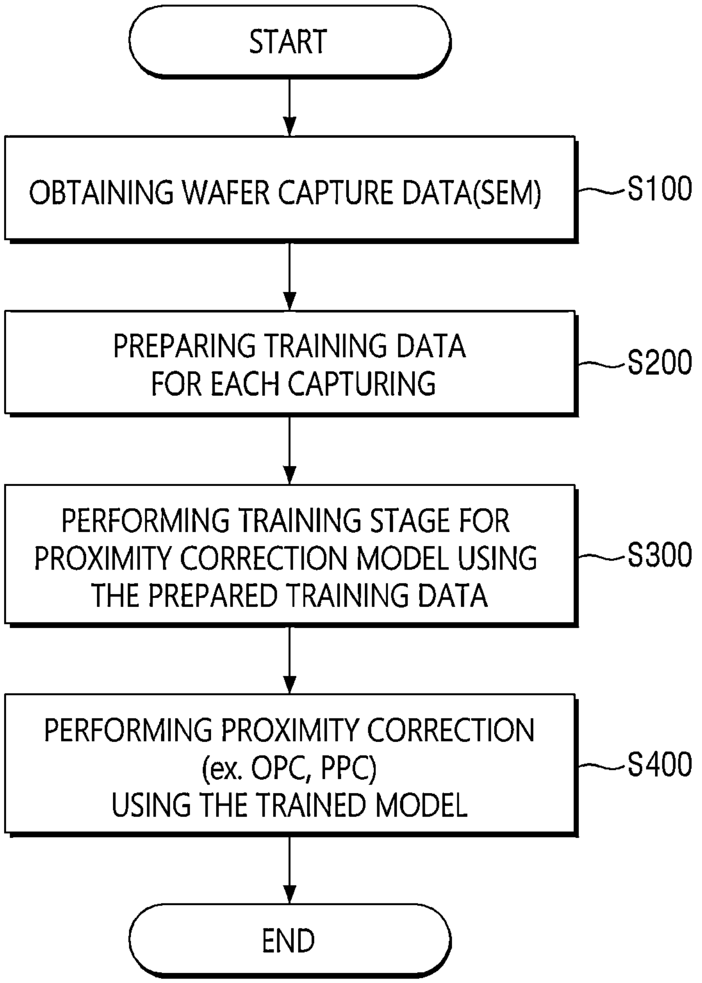
FIG. 6 is a flowchart of a method for generating a proximity correction model according to at least one embodiment of the present disclosure.
Figure 7:
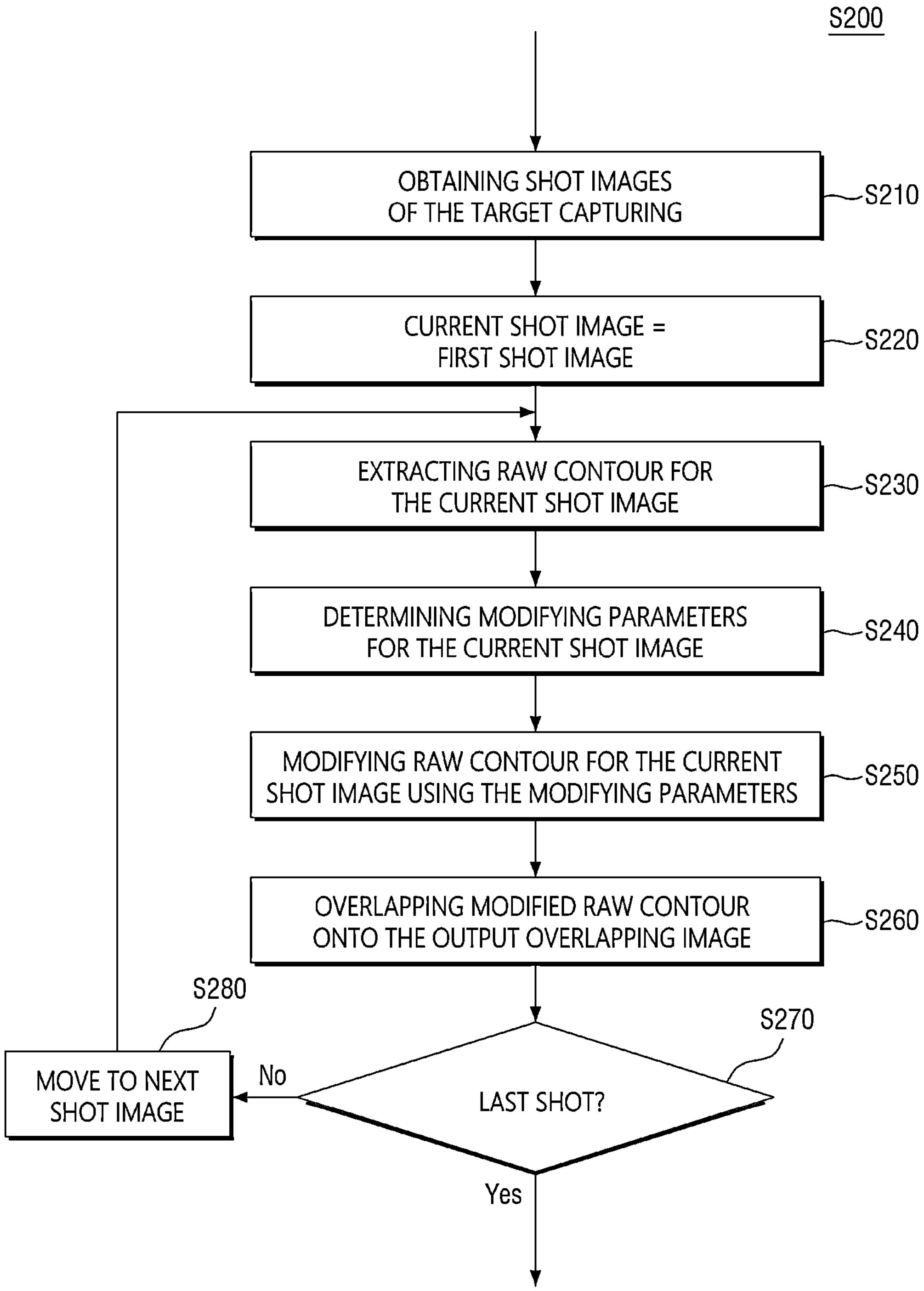
FIG. 7 is a detailed flowchart for explaining in detail some operations of the method for generating a proximity correction model described with reference to FIG. 6.

Hereinafter, a method for generating a proximity correction model according to at least one embodiment of the present disclosure will be described with reference to FIGS. 6 to 8. The method for generating the proximity correction model according to the present embodiment may be performed by one or more computing systems. Further, in the method for generating the proximity correction model according to the present embodiment, some operations may be performed by the first computing device, and the remaining operations may be performed by the second computing device. For example, some operations of the method for generating the proximity correction model may be performed by an on-premise physical server, and the remaining operations may be performed by a cloud compute instance. Hereinafter, when the execution entity of each operation is omitted, the execution entity may be understood as the above-mentioned computing system.

The method for generating the proximity correction model according to the present embodiment will be schematically explained with reference to FIG. 6. The method for generating the proximity correction model according to the present embodiment may be understood as a method for generating a proximity correction model applied in, for example, the manufacturing process. Hereinafter, in order to facilitate understanding, the method for generating the proximity correction model that targets the semiconductor manufacturing process will be described.

In operation S100, a plurality of shot images SEM of the target FOV on the wafer are acquired for the machine learning of the proximity correction model. As mentioned above, the proximity correction model may be understood as a machine learning-based model that is configured to infer the pattern formed on the wafer after performing a first process (e.g., an etching processing) using a first layout.

In operation S200, the learning data is prepared using the plurality of shot images. The learning data may include the plurality of shot images and data of the first layout for a particular FOV of a particular wafer. For example, when the proximity correction model is an OPC model, the learning data may include images of a mask layout, and the plurality of shot images for the particular FOV of the photoresist pattern formed on the wafer as a result of performing the photolithography process using the mask layout. Further, for example, when the proximity correction model is a PPC model, the learning data may include an image of the layout of the photoresist pattern, and a plurality of shot images of the particular FOV of the etching pattern formed on the wafer as a result of performing the etching process, using the photoresist pattern. Further, the learning data may further include an overlap image obtained by overlapping each of the plurality of shot images.

In operation S300, the machine learning is performed on the proximity correction model using the learning data. In the machine learning procedure, a representative image of the plurality of shot images included in the learning data is used as the correct image for the layout image, and the overlap image included in the learning data may be used to determine the weight of the loss value according to the comparison result with the correct image.

In operation S400, the proximity correction process using the proximity correction model may be performed. Regarding the proximity correction process, the operations of the service server and the user terminal described with reference to FIG. 1 may be referred to.

The learning data preparation procedure of operation S200 will be described in detail below with reference to FIG. 7.

In operation S210, the plurality of shot images for measuring the particular FOV of the target wafer are acquired. Next, the current shot image is set as a first shot image (S220). Additionally, the current overlap image will be initialized to a predetermined background pixel value. Thereafter, operations S230 to S280 may be repeatedly performed for each of the plurality of shots.

In operation S230, the raw contour of the current shot image is extracted. In operation S240, deformation parameters of the raw contour image of the current shot image are determined. The deformation parameters may be parameters for performing the predetermined image processing on the raw contour image. The deformation parameters may include an image processing identifier indicating the type of image processing and the parameters of the image processing. For example, the deformation parameters may include an image processing identifier that refers to comprehensive suppression of pixel values, and may include a parameter that refers to the ratio of comprehensive suppression. Additionally, the deformation parameters may include an image processing identifier that refers to dithering, and may include a parameter that refers to the dithering level.

In some embodiments, a plurality of image processes may be applied sequentially to the raw contour image. At this time, the deformation parameters may include both the identifier of each of the applied image processes and the parameters of each of the applied image processes.

In operation S250, the image of the raw contour for the current shot image is deformed, using the deformation parameters. For example, in operation S250, a contour band image may be generated by performing a predetermined level of dithering on the image of the raw contour of the current shot image.

In operation S260, the image of the result of the raw contour image deformation according to operation S250 overlaps the current overlap image.

The operations from operation SS230 to operation S260 will be repeated until processing on the entire plurality of acquired shot images is completed (S270, S280).

Next, the machine learning procedure of operation S300 will be described in detail with reference to FIG. 8. A proximity correction model 60 learned in operation S300 may be a GAN-based artificial neural network model. The proximity correction model 60 may be configured to include a generator that is trained such that the discriminator has difficulty distinguishing between real and fake of the pattern images generated by the generator. Further, the proximity correction model 60 may be trained on the basis of a DCGAN (Deep Convolution GAN) that configures the generator, using a plurality of convolutional layers. A learning method of a DCGAN-based OPC model or a PPC model may be referred to Korean Published Patent No. 2023-0131715.

Figure 8:
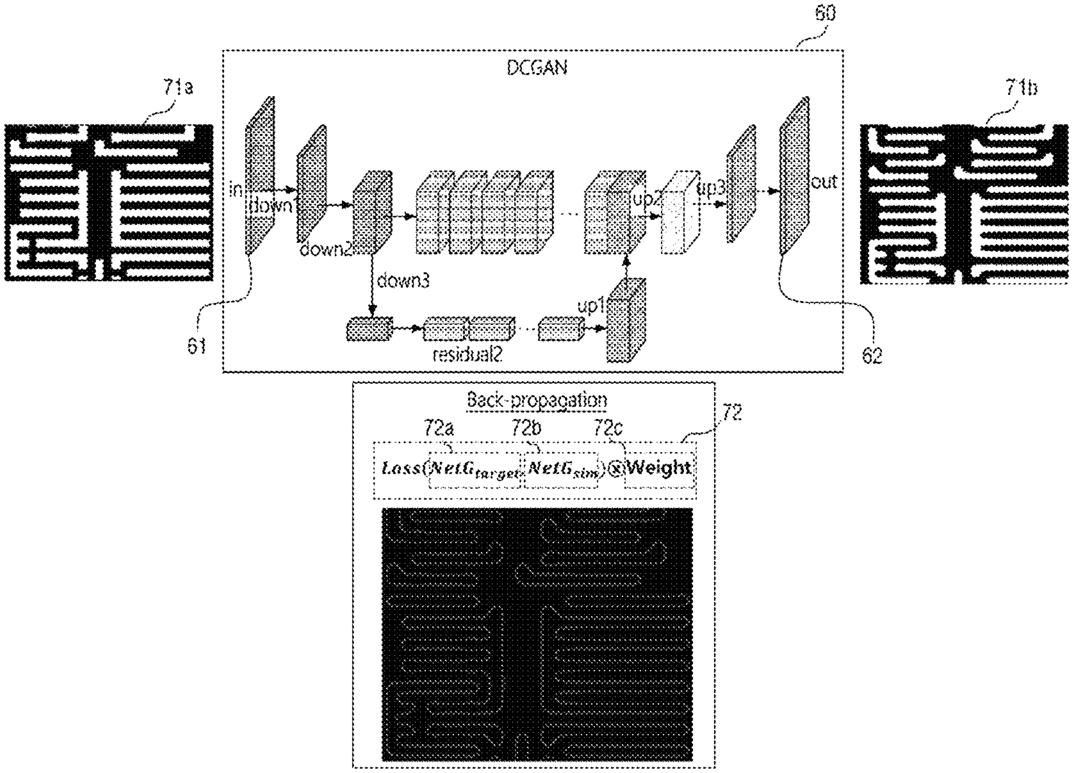
FIG. 8 is a diagram for conceptually explaining a machine learning procedure that may be performed in some embodiments of the present disclosure.

For convenience of understanding, although FIG. 8 shows the proximity correction model 60 made up of the generator, in the machine learning procedure of GAN technology, the generator and the discriminator will update each parameter through adversarial learning. An error back-propagation procedure for updating the parameter will be described below.

First, the learning data will be explained in reference to the proximity correction model 60 being an OPC model (though, the example embodiments are not limited thereto). The learning data may include a mask layout image, an overlap image obtained by overlapping each of the plurality of shot images, and a correct image that is a representative image of the plurality of shot images. The correct image may be, for example, an average image of the raw contours extracted from each of the plurality of shot images. An input layer 61 of the proximity correction model 60, which is an OPC model, receives an image 71 of the mask layout, and an output layer 62 will output an image 72 of the photoresist pattern predicted as a result of performing the photolithography process using the mask layout.

A mask layout image 71*a* is input as an input image for learning of the generator and discriminator that constitute the proximity correction model 60, and an image 71*b* of the photoresist pattern that is inferred on the image of the mask layout may be output by the generator that is learning. A difference in pixel level between the correct image 72*a* included in the learning data as the correct image of the mask layout image 71*a* and the result image 72*b* of inference by the generator is determined as loss data; such that, in the present embodiment, the loss value that constitutes the loss data may be determined for each pixel. At this time, a weight 72*c* may be reflected in the pixel loss value.

The weight 72*c* may be determined, using overlap images included in the learning data. The weight 72*c* may be determined, using the pixel values of the overlap images for the pixel positions corresponding to the pixel loss value. At this time, the weight may be determined such that as the pixel value of the overlap image is close to a value opposite to the background pixel value, the weight increases. The determination of the weight will be explained using the following example.

For example, if the pixel value of the first pixel on the correct image 72*a* is "100" and the pixel value of the first pixel on the result image 72*b* of inference is "102", the loss value for the first pixel becomes "2" which corresponds to the difference between "102" and "100". Further, the pixel value of the first pixel on the overlap image is assumed to be "255", which corresponds to the maximum sharpness. This may mean that the variation for the first pixel of the correct image 72*a* is the minimum value, and the reliability of the pixel value of the first pixel of the correct image 72*a* is the maximum value. Therefore, the maximum value will be given as the weight 72*c* of the loss value for the first pixel.

As described above, a weighted reflection operation is performed on the loss value for each pixel, and the error back-propagation process may be performed using the result 72.

The proximity correction model outputs an image that is as similar as possible to the correct image, which is a representative image of plurality of shot images, through the error back-propagation process of the type described above, and may be learned to have flexibility for the region which has a high variation and a low reliability, among the areas of the correct image. Therefore, the method for generating a proximity correction model according to the present embodiment provides the effect that is capable of generating the proximity correction model that is robust to measured result variation between the plurality of shots, and solves the performance problem of overfitting to the correct image of the learning data and having poor accuracy for new input data.

The method for generating the proximity correction model according to the present embodiment has been described above with reference to FIGS. 6 to 8. The proximity correction model generated by the method for generating the proximity correction model according to the present embodiment may be used to perform the proximity correction of the manufacturing process. This will be explained in detail below. The proximity correction may be an OPC or PPC process, for example.

The proximity correction method of the manufacturing process according to at least one embodiment of the present disclosure will be described. The present embodiment may be performed, for example, by the proximity correction system described with reference to FIG. 1.

First, image data of the first layout is input to the machine-learned proximity correction model. The computing system on which the proximity correction model is deployed may input the image data of the first layout to the proximity correction model.

The computing system then generates a predicted image of the pattern formed after performing the first process using the first layout, using the output data of the proximity correction model.

Next, the proximity correction system performs the proximity correction process, using a difference between the predicted image and the target image. For example, when an adjustment command of the first layout for reducing the difference between the target image and the predicted image is input from a user terminal, a task in which the first layout is adjusted according to the adjustment command, and the computing system inputs the adjusted image data of the first layout into the proximity correction model, thereby checking the predicted image of the updated pattern may be repeated.

At this time, the proximity correction model may be a model that is machine-learned using an overlap image obtained by overlapping the plurality of shot images of the wafer after the first process is performed. As mentioned above, the proximity correction model is a model generated by performing an error back-propagation using the weighted results of the loss data that indicates a difference between the correct image, which is the measured result of the pattern formed as a result of performing the first process using the first layout, and the image that is output by the proximity correction model, and the weights may be values determined using the overlap image.

For example, the proximity correction method of the manufacturing process according to the present embodiment may be a method for performing the PPC. At this time, the first layout is a layout of the photoresist pattern, the first process may be an etching process, the pattern formed after the first process may be an etching pattern, and the target image may be ACI (After Cleaning Inspection) target image. At this time, the performing the proximity correction process may include adjusting the layout of the photoresist pattern, using a difference between the ACI target image and the predicted image of the etching pattern. Then, a pattern may be produced on a wafer based on the adjusted photoresist pattern.

Figure 9:
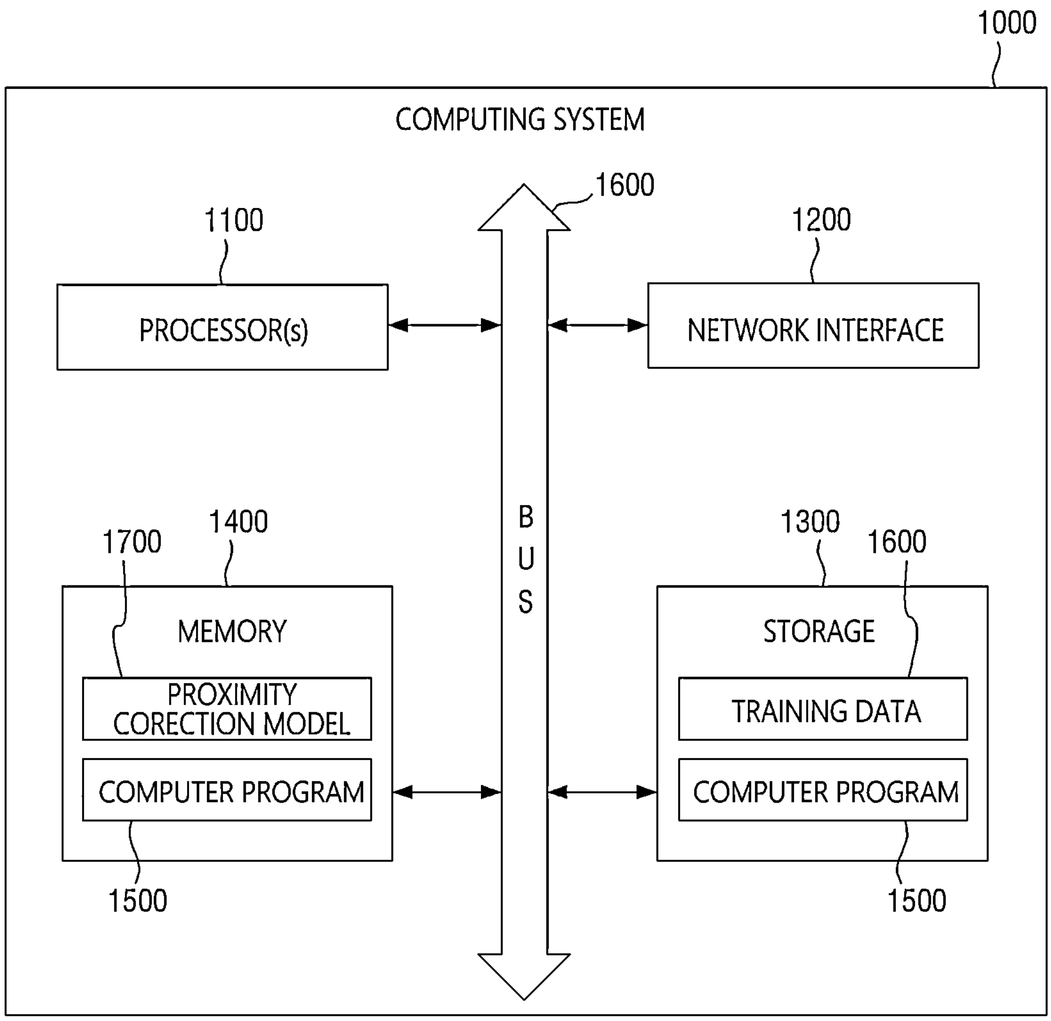
FIG. 9 is a hardware configuration diagram of a computing system for proximity correction processing according to at least one embodiment of the present disclosure.

FIG. 9 is a hardware configuration diagram of a computing system 1000 according to some embodiments of the present disclosure. In at least one embodiment, at least one of the proximity correction model trainer 100 and/or the service server 200 described with reference to FIG. 1 may include a computing system 1000 of FIG. 9. The computing system 1000 may include one or more processors 1100, a system bus 1600, a communication interface 1200, a memory 1400 that loads a computer program 1500 to be executed by the processors 1100, and a storage 1300 that stores the computer program 1500.

The processor 1100 is configured to control the overall operation of each component of the computing system 1000. The processor 1100 may perform computations on at least one application or program for executing methods/operations according to various embodiments of the present disclosure. The memory 1400 is configured to store various types of data, instruction and/or information. The memory 1400 may load one or more computer programs 1500 from the storage 1300 to perform methods/operations according to various embodiments of the present disclosure. The bus 1600 provides communication function between components of the computing system 1000.

The communications interface 1200 is configured to support communication with external devices using, e.g., Internet communications, a wired local area network (LAN), a wireless local area network (WLAN) such as a wireless fidelity (Wi-Fi), a wireless personal area network (WPAN) such as Bluetooth, a wireless universal serial bus (USB), Zigbee, near field communication (NFC), radio-frequency identification (RFID), power line communication (PLC), and a communication interface capable of connecting to a mobile cellular network, such as 3rd generation (3G), 4th generation (4G), 5th generation (5G), long term evolution (LTE), and/or the like. For example, the communication interface 1200 may receive at least one among the image data of the first layout, and data of the plurality of shot images for the pattern formed as a result of performing the first process using the first layout.

The storage 1300 may non-temporarily store one or more computer programs 1500. Additionally, the storage 1300 may store learning data 1600 and executable data of the computer programs.

The computer program 1500 may include one or more instructions in which methods/operations according to various embodiments of the present disclosure are implemented. When the computer program 1500 is loaded into the memory 1400, the processor 1100 may perform the methods/operations according to various embodiments of the present disclosure by executing one or more instructions.

In some embodiments, the computing system 100 described with reference to FIG. 9 may be configured using one or more physical servers included in a server farm on the basis of cloud technology, such as virtual machines. In these cases, among the components shown in FIG. 9, at least some of the processor 1100, the memory 1400, and the storage 1300 may be virtual hardware, and the communication interface 1200 may also be configured as a virtualized networking element such as a virtual switch.

The computer program 1500 may include an instruction for acquiring a plurality of shot images on the wafer after performing the first process using the first layout, an instruction for generating an overlap image by overlapping the plurality of shot images, and an instruction for performing the machine learning on the proximity correction model, using image of the first layout and the overlap image. In the proximity correction model 1700 generated as a result of machine learning, at least some layers are stored in the memory 1400 and may be deployed to the storage 1300 or an external computing device. It will be clearly understood that the computer program 1500 may be configured to include instructions for implementing the methods that may be understood through some embodiments described above.

Various embodiments of the present disclosure and effects according to the embodiments have been described with reference to FIGS. 1 to 9. The effects according to the technical idea of the present disclosure are not limited to the effects mentioned above, and other effects not described can be clearly understood by those skilled in the art from the description above.

The technical ideas of the present disclosure described so far can be implemented as computer-readable code on a computer-readable medium. The computer program recorded on the computer-readable recording medium can be transmitted to another computing device through a network such as the Internet, installed on the other computing device, and thus used on the other computing device.

Although operations are shown in a specific order in the drawings, it should not be understood that the operations are not limited to the specific order or sequential order and/or when all of the operations must be performed, unless indicated and/or implied otherwise. For example, in certain situations, multitasking and parallel processing may be advantageous. Although embodiments of the present disclosure have been described above with reference to the attached drawings, those skilled in the art will understand that the present disclosure may be implemented in other specific forms without changing the technical idea or essential features. The embodiments described above should be understood in all respects as illustrative and not restrictive. The scope of protection of the present invention should be interpreted in accordance with the claims below, and all technical ideas within the equivalent scope should be construed as being included in the scope of rights of the technical ideas defined by this disclosure.

What is claimed is:

1. A method for generating a proximity correction model which is performed by a computing system, the method comprising:

acquiring a plurality of shot images of a wafer after performing a first process on the wafer using a first layout;

generating an overlap image, the overlap image obtained by overlapping the plurality of shot images; and performing machine learning on the proximity correction model such that the proximity correction model is configured to generate a predicted image of a pattern formed after performing the first process using a target layout, the performing the machine learning including using training data including an image of the first layout and the overlap image, wherein the generating the overlap image comprises extracting contours of each of plurality of shot images, dithering the extracted contours of each of the plurality of shot images, and generating the overlap image by overlapping the dithered contours of each of the plurality of shot images.

2. The method for generating the proximity correction model of claim 1, wherein a first area of the overlap image has a first sharpness that indicates a first measurement reliability, a second area of the overlap image has a second sharpness that indicates a second measurement reliability, the first area and the second area are areas that do not overlap each other, and the first sharpness is different from the second sharpness.

3. The method for generating the proximity correction model of claim 2, wherein the first area is a corner area of a pattern included in a FOV (Field of View) of the wafer, the second area is a line area included in the FOV, the first sharpness is lower than the second sharpness, and the first measurement reliability is lower than the second measurement reliability.

4. The method for generating the proximity correction model of claim 2, wherein the first area is a line-end area of a pattern included in a FOV (Field of View) of the wafer, the second area is a line area included in the FOV, the first sharpness is lower than the second sharpness, and the first measurement reliability is lower than the second measurement reliability.

5. The method for generating the proximity correction model of claim 2, wherein the first area is a convex area of a pattern included in a FOV (Field of View) of the wafer, the second area is a line area included in the FOV, the first sharpness is lower than the second sharpness, and the first measurement reliability is lower than the second measurement reliability.

6. The method for generating the proximity correction model of claim 1, wherein the proximity correction model is an image-to-image model which is configured to receive an image of the first layout.

7. The method for generating the proximity correction model of claim 1, wherein the dithering the extracted contours comprises:

dithering the extracted contours at a same level for each of the plurality of shot images.

8. The method for generating the proximity correction model of claim 1, wherein the performing machine learning comprises:

performing the machine learning on the proximity correction model, by further using a representative image, representing the plurality of shot images, as a correct image.

9. The method for generating the proximity correction model of claim 8, wherein the representative image is an image representing an average contour of the plurality of shot images.

10. The method for generating the proximity correction model of claim 8, wherein the performing the machine learning on the proximity correction model, by further using the representative image representing the plurality of shot images comprises:

updating parameters of the proximity correction model by performing an error back-propagation using loss data, the loss data representing a difference between an image output by the proximity correction model and the representative image.

11. The method for generating the proximity correction model of claim 10, wherein the loss data comprises pixel loss values in pixel units, and wherein the performing the error back-propagation comprises using the overlap image to determine weights of each of the pixel loss values, and performing back-propagation that updates the parameters of the proximity correction model using each pixel loss value reflecting the determined weights.

12. The method for generating the proximity correction model of claim 11, wherein the determining the weights of each pixel loss value using the overlap image comprises:

determining the weight using a pixel value of the overlap image for a pixel position corresponding to the pixel loss value.

13. The method for generating the proximity correction model of claim 12, wherein the determining the weight using the pixel value of the overlap image comprises:

determining the weight such that the weight increases as the pixel value of the overlap image approaches a value opposite to a pixel value of a background pixel.

14. The method for generating the proximity correction model of claim 1, wherein the first layout is a layout of a photoresist pattern, the first process is an etching process, the plurality of shot images on the wafer are a plurality of images of an etching pattern included in an FOV (Field Of View) area of the wafer, the etching pattern is a pattern formed on the wafer by the etching process, and the method further comprises adjusting the layout of the photoresist pattern by performing a PPC (Process Proximity Correction) process, the PPC process using a difference between an output image of the proximity correction model and an ACI (After Cleaning Inspection) target image.

15. The method for generating the proximity correction model of claim 1, wherein the first layout is a mask layout, the first process is a photolithography process, the plurality of shot images of the wafer are a plurality of images of a photoresist pattern included in an FOV (Field Of View) area of the wafer, the photoresist pattern is a pattern developed on the wafer by the photolithography process, and the method further comprises adjusting the layout of the photoresist pattern by performing an OPC (Optical Proximity Correction) process, the OPC process using a difference between an output image of the proximity correction model and an ADI (After Develop Inspection) target image.

16. A proximity correction method of a manufacturing process which is performed by a computing system, the method comprising:

inputting, to a machine-learned proximity correction model, image data of a first layout;

generating, using output data of the proximity correction model, a predicted image of a pattern formed after performing a first process using the first layout;

adjusting the first layout by performing a proximity correction process on the first layout, the proximity correction process based on a difference between the predicted image and a target image; and performing a process of the manufacturing process using the first layout on which the proximity correction process was performed, wherein the proximity correction model is machine-learned using an overlap image obtained by overlapping a plurality of shot images of a wafer after performing the first process on the wafer.

17. The proximity correction method of the manufacturing process of claim 16, wherein the proximity correction model is generated through an error back-propagation using a weighted result of loss data indicating a difference between a correct image and an image output by the proximity correction model, the correct image including a measured result of a pattern formed as a result of performing the first process using the first layout, and the weight is a value determined using the overlap image.

18. The proximity correction method of the manufacturing process of claim 16, wherein the first layout is a layout of a photoresist pattern, the first process is an etching process, the pattern formed after performing the first process is an etching pattern, the target image is an ACI (After Cleaning Inspection) target image, and the performing the proximity correction process comprises adjusting the layout of the photoresist pattern based on a difference between the ACI target image and a predicted image of the etching pattern.

19. A proximity correction process system comprising:

a communication interface configured to receive image data of a first layout;

storage storing executable data of a computer program;

memory; and a processor configured to execute computer programs loaded into the memory, wherein the computer program comprises instructions, which when executed by the processor causes the proximity correction process system to input the received image data of the first layout to a proximity correction model, generate a predicted image of a pattern formed after execution of a first process using the first layout using output data of the proximity correction model, and adjust the first layout by performing a proximity correction process on the first layout, the proximity correction process based on a difference between the predicted image and a target image, and performing a process of a manufacturing process using the first layout on which the proximity correction process was performed, wherein the proximity correction model is machine-learned using an overlap image obtained by overlapping a plurality of shot images on a wafer after execution of the first process.

* * * * *